F. HACHMANN.
HOSE MENDER.
APPLICATION FILED JAN. 2, 1919.
1,358,633.
Patented Nov. 9, 1920.
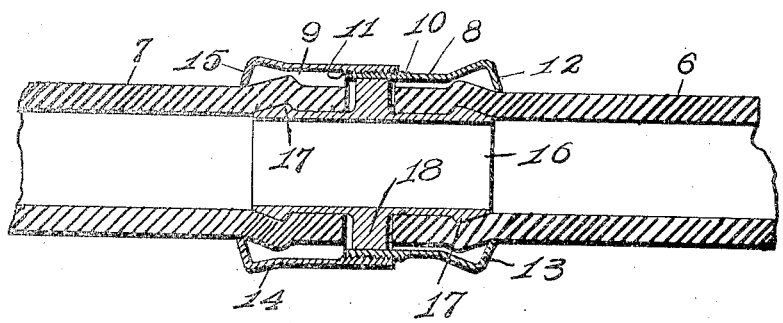
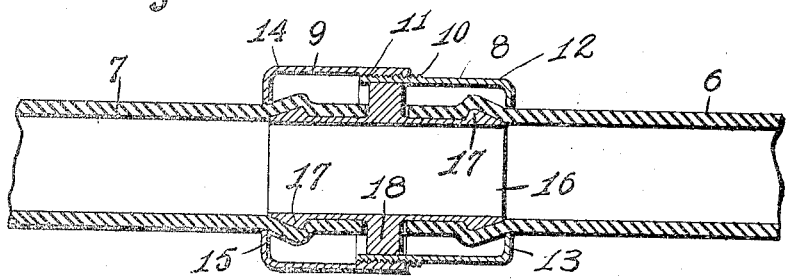
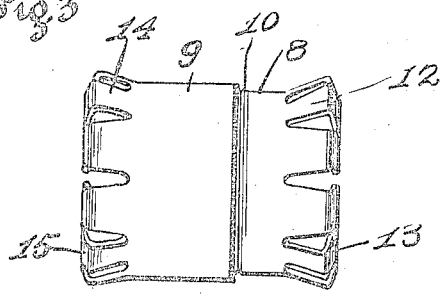
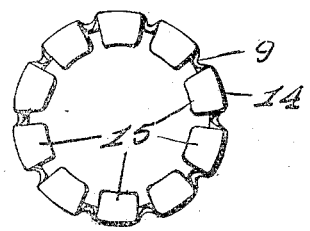
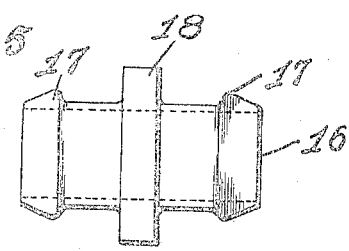
Inventor
Frederick Hachmann
by Edward E. Longan
Atty

UNITED STATES PATENT OFFICE.

FREDERICK HACHMANN, OF ST. LOUIS, MISSOURI, ASSIGNOR OF ONE-EIGHTH TO DAVID M. HUTCHINSON, OF FERGUSON, MISSOURI.

HOSE-MENDER.

1,358,633.  Specification of Letters Patent.  Patented Nov. 9, 1920.

Application filed January 2, 1919. Serial No. 269,224.

*To all whom it may concern:*

Be it known that I, FREDERICK HACHMANN, a citizen of the United States, and resident of St. Louis, and State of Missouri, have invented certain new and useful Improvements in Hose-Menders, of which the following is a specification, containing a full, clear, and exact description, reference being had to the accompanying drawings, forming a part thereof.

My invention relates to certain new and useful improvements in hose menders and has for its primary object, the construction of a mender for mending different thicknesses of hose whereby the hose sections are held tightly over the mender sleeve by a pair of screw threaded coupling members which surround the hose where joined.

Another object is to construct a hose mender, the mending sleeve of which has a circular rib surrounding the same midway its ends and of a diameter sufficient to act as a support for the securing or tightening sleeves made use of, thereby preventing the tightening sleeves from being mashed or bending in the center as well as giving rigidity to the mended portion of the hose.

In the drawings:

Figure 1 is a longitudinal section of my invention applied to a heavy ply hose.

Fig. 2 is a longitudinal section of the same as applied to a thin ply hose, showing the gripping prongs adjusted to the outer surface of same.

Fig. 3 is a side view of the gripping members.

Fig. 4 is an end view of the same.

Fig. 5 is a side view of the mender sleeve.

Referring to the drawings, 6 and 7 indicate sections of a heavy ply hose. 8 and 9 indicate gripping or clamping members, 8 being the male and 9 the female member; the former provided with external screw threads as at 10 and the latter with internal screw threads as at 11.

Formed on the end of the gripping member 8 is a series of gripping prongs 12, each having a downwardly turned flange 13. Formed on the female member 9 is a series of the same gripping prongs 14, each having a downwardly turned or bent portion 15. In the connecting or mending of heavy ply hose, these prongs occupy the positions illustrated in Fig. 1. In the connecting or mending of a thin ply hose, the prongs are adjusted on the external surface of the hose sections as illustrated in Fig. 2.

16 indicates the coupling sleeve which is provided on each end with a shoulder 17, and intermediate of the shoulders, with a rib or flange 18, the shoulder 17 being of a size to be forced into the hose sections and the rib or flange 18 being substantially of the internal diameter of the gripping or clamping member 8. When the coupling or mending member 16 has been inserted into the ends of the hose sections, the ends of the sections will abut against the sides of the flange 18 as illustrated in Figs. 1 and 2. This coupling member or sleeve is preferably cast, whereas the gripping or clamping members 8 and 9 are stamped from sheet metal.

In using my invention for coupling or mending hose, for instance a heavy ply hose, the gripping member 8 is slipped over one section of the hose and the gripping member 9 is slipped over the other section and after these members have been passed over the ends of the hose section, the coupling member or sleeve 16 is then inserted into the ends of the hose. The two sections 8 and 9 are then screwed together so as to adjust or tighten the downwardly bent portions of the prongs 13 and 15 against the external surface of the hose sections.

It will be observed that the shoulders 17 of the coupling sleeve will force the hose sections outwardly so as to form, as it were, shoulders against which the bent portions 13 and 15 will engage and clamp. The rib 18 not only answers as an abutment against which the free ends of the hose sections abut, but also answers as a brace or reinforcement for the central portion of the clamping members 8 and 9, this being necessary because these members are made of thin sheet metal and if it would be desired to adjust the same relative to each other by the application of a wrench, this rib or flange 18 would prevent the mashing, in, as it were, of the sections. This flange or rib 18 also performs another purpose or function in the use of my device on a thin ply hose as illustrated in Fig. 2; that is when my device is applied to a thin ply hose, the prongs 12 and 14 are bent downwardly by means of a hammer or other suitable tool in which case, the rib or flange 18 answers as a support for the body of the clamping members 8 and 9.

Having fully described my invention, what I claim is:

1. A hose mender comprising a sleeve, a tapered enlargement formed on each end of said sleeve, an integrally formed flange extending around said sleeve and midway its length, a pair of members provided with screw threads on one end and hooked prongs on the other, said prongs adapted to be bent so that the hook sections engage beyond the shoulders of the sleeve, one of said screw threaded members adapted to fit within the other and to embrace the flange, said flange acting as an abutment for the end of the hose and as a brace for the center of the screwthreaded members.

2. A hose mender comprising a sleeve having a conical shaped projection on each end, a projecting flange formed integral with the sleeve and midway the length thereof, said flange being of larger diameter than the conical projections, a pair of members having inwardly bent prongs formed on one end thereof, the inner end of one of said members being externally screw threaded, the other internally threaded and adapted to fit one within the other, the externally threaded member adapted to fit closely around the flange and be supported thereby when the two members are secured together.

In testimony whereof, I have signed my name to this specification, in the presence of two subscribing witnesses.

FREDERICK HACHMANN.

Witnesses:
C. M. MALONE,
ELIZABETH CARTELL.